(12) United States Patent
Rousseau

(10) Patent No.: US 9,752,610 B2
(45) Date of Patent: Sep. 5, 2017

(54) DEVICE FOR LOCKING A NUT

(71) Applicant: SNECMA, Paris (FR)

(72) Inventor: Alain Jean-Claude Rousseau, Le Plessis Robinson (FR)

(73) Assignee: SNECMA, Paris (FR)

( * ) Notice: Subject to any disclaimer, the term of this patent is extended or adjusted under 35 U.S.C. 154(b) by 336 days.

(21) Appl. No.: 14/687,120

(22) Filed: Apr. 15, 2015

(65) Prior Publication Data

US 2015/0292544 A1    Oct. 15, 2015

(30) Foreign Application Priority Data

Apr. 15, 2014   (FR) ...................................... 14 53340

(51) Int. Cl.
*F16B 39/10*    (2006.01)
*F16B 39/12*    (2006.01)
(Continued)

(52) U.S. Cl.
CPC .............. *F16B 39/12* (2013.01); *F01D 5/026* (2013.01); *F01D 5/027* (2013.01); *F01D 5/066* (2013.01);
(Continued)

(58) Field of Classification Search
CPC .......... F16B 39/12; F16B 39/10; F01D 5/026; F01D 5/066
(Continued)

(56) References Cited

U.S. PATENT DOCUMENTS

| | | |
|---|---|---|
| 1,370,216 A | 3/1921 | Lester et al. |
| 1,441,619 A | 1/1923 | Wisch |

(Continued)

FOREIGN PATENT DOCUMENTS

| | | |
|---|---|---|
| AU | 618 179 | 12/1991 |
| EP | 1 471 269 A2 | 10/2004 |
| FR | 2 978 218 A1 | 1/2013 |

OTHER PUBLICATIONS

French Preliminary Search Report issued Dec. 12, 2014 in French Application 14 53340, filed on Apr. 15, 2014 (with English Translation of Categories of Cited Documents).

*Primary Examiner* — Gary Estremsky
(74) *Attorney, Agent, or Firm* — Oblon, McClelland, Maier & Neustadt, L.L.P.

(57) ABSTRACT

The invention relates to a device for locking a nut (13) in a tightened position on a rotary shaft (12), said rotary shaft (12) being hollow at least at one end (14). The locking device comprises a plurality of outer notches (16) formed in a face of the nut (13), said outer notches (16) extending parallel to a longitudinal axis (X) of the nut (13), a plurality of inner notches (15) formed in the end (14) of the rotary shaft (12), said inner notches (15) extending parallel to a longitudinal axis (X) of the rotary shaft (12), and a ring (18) suitable for being installed inside said end (14) of the rotary shaft (12) and presenting at least one first radial finger (19) for being received both in one of the inner notches (15) and in one of the outer notches (16) with the nut (13) being in a tightened position and the two notches (15, 16) housing said first radial finger (19) being at least partially in alignment in a radial direction. In order to balance the ring about a central axis (X), the ring (18) presents an internal outline (21) arranged in such a manner that the barycenter (B) of said internal outline (21) is offset relative to said longitudinal axis (X) when the ring (18) is installed inside the end (14) of the rotary shaft (12).

10 Claims, 2 Drawing Sheets

(51) Int. Cl.
   *F01D 5/02*  (2006.01)
   *F01D 5/06*  (2006.01)

(52) U.S. Cl.
   CPC .......... *F16B 39/10* (2013.01); *F05D 2250/73* (2013.01); *F05D 2260/36* (2013.01); *Y02T 50/671* (2013.01)

(58) Field of Classification Search
   USPC ................................ 411/147, 197, 504, 221
   See application file for complete search history.

(56) References Cited

U.S. PATENT DOCUMENTS

| | | | |
|---|---|---|---|
| 1,613,493 A | 1/1927 | Turner et al. | |
| 5,221,168 A * | 6/1993 | Kasai | F16C 35/063 411/124 |
| 5,674,034 A * | 10/1997 | Bennett | F16B 39/10 411/120 |
| 5,772,373 A * | 6/1998 | Cronin, II | B25B 13/48 411/120 |
| 5,967,723 A * | 10/1999 | Duran | F16B 39/282 411/121 |
| 6,095,735 A * | 8/2000 | Weinstein | F16B 39/10 411/197 |
| 6,290,442 B1 * | 9/2001 | Peterkort | F16B 41/002 411/120 |
| 7,029,218 B2 * | 4/2006 | Peterkort | F16B 41/002 411/119 |
| 7,927,052 B1 * | 4/2011 | Varden | F16B 39/108 411/197 |
| 8,016,531 B2 * | 9/2011 | White | F16B 39/10 301/105.1 |
| 8,469,460 B2 * | 6/2013 | Martin, III | B60B 37/10 301/105.1 |
| 9,051,951 B2 * | 6/2015 | Zhu | F16B 7/182 |
| 9,435,370 B2 * | 9/2016 | Hughes | F16B 39/32 |
| 9,527,346 B2 * | 12/2016 | Ebert | B60B 27/0078 |
| 2014/0140787 A1 | 5/2014 | Gignoux et al. | |

\* cited by examiner

DEVICE FOR LOCKING A NUT

BACKGROUND OF THE INVENTION

The present invention relates to a device for locking a nut, and more particularly to a device for locking a nut in a tightened position on a rotary shaft.

In order to prevent a nut from loosening after it has been tightened on a rotary shaft, it is common practice to use locking devices. Certain nuts of small size are provided with a so-called "self-locking" device that is normally in the form of a polymer ring adjacent to the tapping of the nut. Nevertheless, such self-locking devices are not normally used with nuts of large size.

Another alternative is to use a locking device that operates by co-operation between a finger and notches. For example, on the CFM-56 turbojet, a nut tightened onto a rotary turbine shaft is locked by a ventilation tube situated inside the rotary shaft. A finger is installed on the ventilation tube and it is received in mutually aligned notches in the nut and in the shaft, thus preventing the nut loosening. The finger is prevented from tilting by the tube being centered at a plurality of locations along its length.

However, such a ventilation tube is not always available. In order to be able nevertheless to achieve reliable locking of a nut of large size, patent application FR 2 978 218 proposes an alternative locking device, enabling a nut to be locked in a tightened position on a hollow rotary shaft, at least one end. That locking device comprises a plurality of outer notches formed in a face of the nut, said outer notches extending parallel to a longitudinal axis of the nut, and a plurality of inner notches formed in the end of the rotary shaft, said inner notches extending parallel to a longitudinal axis of the rotary shaft, together with a ring suitable for being installed inside said end of said rotary shaft and presenting at least one first radial finger that is to be received both in one of the inner notches and also in one of the outer notches, when the nut is in a tightened position and the two notches housing said first radial finger are at least partially in alignment in a radial direction.

On a rotary shaft, it is also important to achieve accurate balancing of all of the parts so as to avoid any unbalance that would lead to vibration, noise, and fatigue. Thus, in the device disclosed in FR 2 978 218, it is proposed to balance the ring with additional fingers that are shorter and that are received only in the inner notches of the rotary shaft. Nevertheless, that solution requires compromises in the design of the device, in particular concerning the positioning and the dimensioning of the notches.

OBJECT AND SUMMARY OF THE INVENTION

The invention seeks to remedy those drawbacks. In particular, the present invention seeks to propose a device for locking a nut in a tightened position on a rotary shaft that is hollow at at least one end, which device enables accurate balancing to be obtained without other drawbacks.

For this purpose, in at least one embodiment of a locking device comprising a plurality of outer notches formed in a face of the nut, said outer notches extending parallel to a longitudinal axis of the nut, a plurality of inner notches formed in the end of the rotary shaft, said inner notches extending parallel to a longitudinal axis of the rotary shaft, and a ring suitable for being installed inside said end of the rotary shaft and presenting at least one first radial finger for being received both in one of the inner notches and in one of the outer notches with the nut being in a tightened position and the two notches housing said first radial finger being at least partially in alignment in a radial direction, the ring may present an internal outline arranged in such a manner that the barycenter of the internal outline, i.e. the mean position of the set of points constituting the internal outline, is offset relative to said longitudinal axis, and in particular is offset towards said first radial finger relative to the longitudinal axis.

Because of this offset of the barycenter of the internal outline, it is possible to balance the mass of the ring accurately in such a manner that its center of mass is centered on the longitudinal axis of rotation of the rotary shaft in spite of the presence of at least one first finger on the ring.

In order to facilitate this balancing and in order to facilitate fabrication of the ring, the internal outline need not be circular, and in particular it may present a flat.

In order to prevent the ring from tilting, it may present at least two other radial fingers that are shorter than the first finger, each of these at least two other fingers being received in respective ones of said inner notches. In particular, the ring may present three radial fingers that are shorter than the first finger.

In order to maximize the number of angular positions of the nut relative to the rotary shaft in which at least one inner notch and at least one outer notch are sufficiently well aligned in the radial direction to be capable of receiving a first radial finger in both notches simultaneously, the number of outer notches and the number of inner notches may be mutually prime. The term "mutually prime" is used to mean that they have no common divisor other than 1.

In order to better stabilize the position of the ring, the inner notches and the outer notches may present bottoms that are substantially aligned in a common transverse plane when the nut is in a tightened position.

In order to simplify the structure of the device, the device may be configured in such a manner that only one inner notch and only one outer notch are positioned to receive the first radial finger with the nut in a tightened position.

In order to facilitate reducing slack, all of the notches may have the same width.

The present disclosure also relates to a turbomachine having at least one rotary shaft, a nut, and such a locking device in order to lock the nut on the shaft in a tightened position.

The term "turbomachine" is used in the present context to designate any machine that can serve to transfer energy between a flow of fluid and at least one set of blades, such as for example a compressor, a pump, a turbine, or a combination of at least two of them. Certain internal combustion turbomachines, such as gas turbines, turboshaft engines, turbofans, turbojets, or turboprops, serve to convert the chemical energy of fuel into mechanical energy by combustion of the fuel in the working fluid, which combustion takes place in a combustion chamber. Typically, these turbomachines comprise at least one compressor upstream from the combustion chamber and at least one turbine downstream from the combustion chamber and coupled to the compressor in order to actuate it by part of the expansion of the working fluid that has been heated by combustion of the fuel. Normally, a remainder of the thermal energy of the working fluid can then be recovered as mechanical energy via a jet nozzle and/or by means of at least one additional turbine coupled to a drive shaft.

In such a turbomachine, a rotary shaft may typically rotate at very high speed, in the order of 20,000 to 30,000 revolutions per minute. It is thus particularly important to achieve accurate balancing of rotary parts, particularly since they may simultaneously be subjected to very high levels of thermal and mechanical stress.

The present disclosure also provides a method of locking a nut in a tightened position on a rotary shaft, a face of the nut presenting a plurality of outer notches extending parallel to a longitudinal axis of the nut, the rotary shaft being hollow at least at an end that presents a plurality of inner notches, and at least one of the inner notches and at least one of the outer notches being at least partially in alignment in a radial direction, said locking method comprising a step in which a ring presenting at least one first radial finger and an internal outline is installed inside said end of the rotary shaft with said at least one first radial finger received simultaneously in the inner notch and the outer notch that are in alignment, and with the barycenter of said internal outline being offset relative to said longitudinal axis, in particular towards said first radial finger.

BRIEF DESCRIPTION OF THE DRAWINGS

The invention can be well understood and its advantages appear better on reading the following detailed description of an embodiment shown by way of non-limiting example. The description refers to the accompanying drawings, in which.

DETAILED DESCRIPTION OF THE INVENTION

Figure 1:
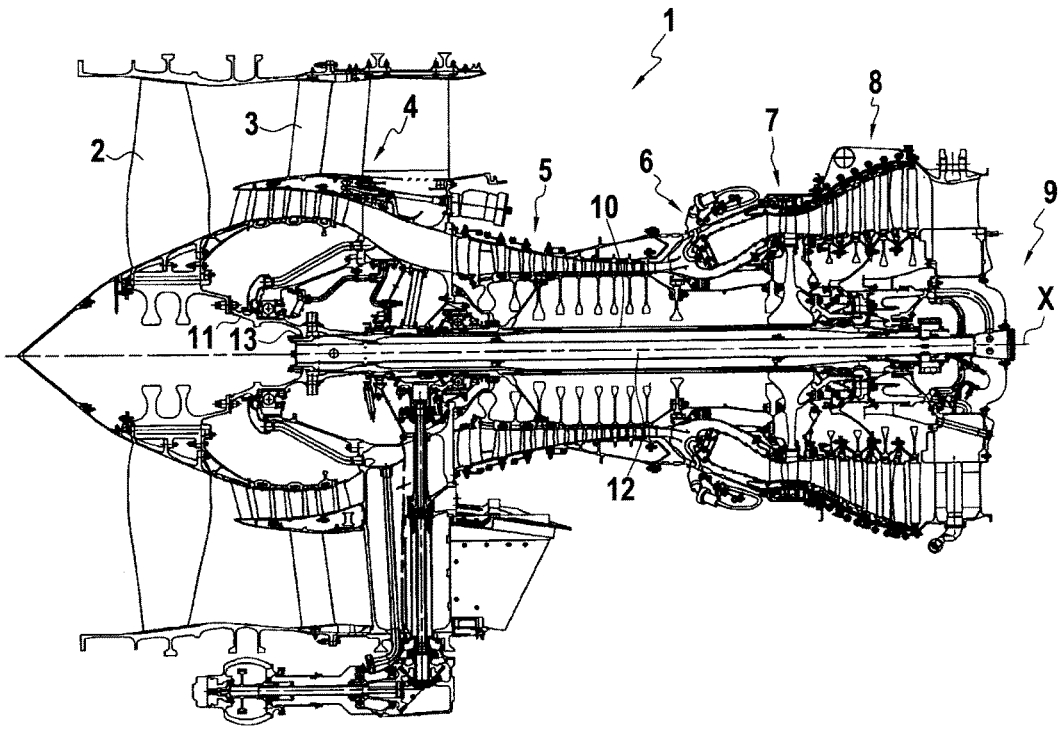
FIG. 1 is a longitudinal section view of a turbomachine having two rotary shafts connected together by a nut fitted with a locking device in an embodiment of the invention.

FIG. 1 shows a turbomachine, and more specifically a turbofan 1. This turbofan 1 has a fan 2 with guide vanes 3, and a low pressure compressor 4, a high pressure compressor 5, an annular combustion chamber 6, a high pressure turbine 7, a low pressure turbine 8, and a nozzle 9, together with a first rotary shaft 10, a second rotary shaft 11, and a third rotary shaft 12. Each of the compressors 4 and 5 and of the turbines 7 and 8 is made up of a plurality of stages, each stage having a stationary set of guide vanes and a movable set of blades secured to one of the rotary shafts 10, 11, or 12. Said rotary shafts 10, 11, and 12 are used in particular for actuating the compressors 4 and 5 and the fan 2 by means of the turbines 7 and 8. The first rotary shaft 10 couples rotation between the rotary blades with the high pressure turbine 7 and of the high pressure compressor 5 so that partial expansion of the combustion gas in the high pressure turbine 7 serves to actuate the high pressure compressor 5 while the turbofan 1 is in operation. The second rotary shaft 11, secured to the rotary blades of the low pressure compressor 4 and of the fan 2, and the third rotary shaft 12 secured to the rotary blades of the low pressure turbine 8 are coupled together by the nut 13, in such a manner that additional expansion of the combustion gas in the low pressure turbine 8 serves to actuate the low pressure compressor 4 and also the fan 2 while the turbofan 1 is in operation. Finally, the nozzle 9 serves to obtain final expansion of the combustion gas, thereby generating jet thrust in the direction opposite to the direction in which the gas is ejected. Nevertheless, the major portion of the thrust generated by the turbofan is generally the thrust generated by the fan. In operation, the rotary shafts 10, 11, and 12 rotate at speeds that are sufficiently high for it to be very important to minimize any unbalance in the rotary parts.

Figure 2:
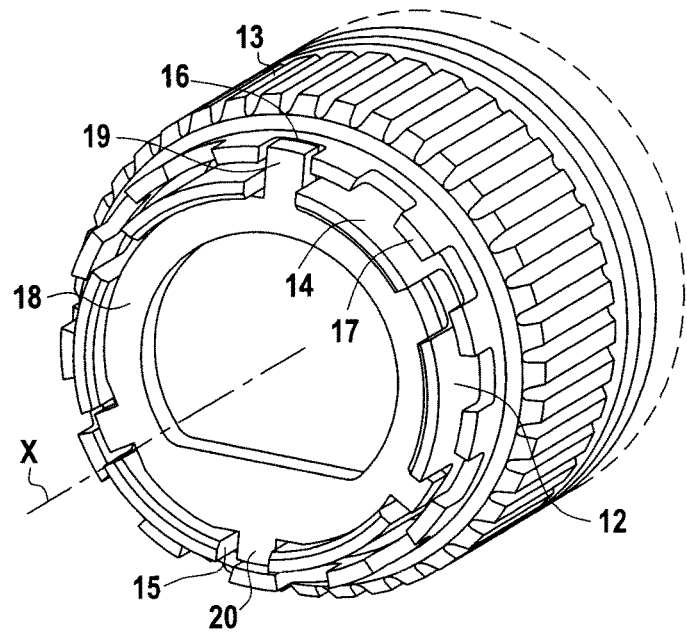
FIG. 2 is a perspective view of the nut tightened onto one of the rotary shafts and locked by the device in an embodiment of the invention.

FIG. 2 is a detail view of the nut 13 tightened onto one end 14 of the rotary shaft 12. This end 14 is hollow and presents a thread complementary to the thread of the nut 13 together with notches 15 extending parallel to a longitudinal axis X of the rotary shaft 12 and of the nut 13, which notches are referred to in the present context as "inner" notches. The nut 13 also has notches 16 in its face 17 that faces in the distal direction of the end 14, these notches 16 also extending along the longitudinal axis X. Since these notches 16 formed in the nut 13 are situated radially outside the inner notches 15, they are referred to in this context as outer notches. In the embodiment shown, the number of inner notches 15 and the number of outer notches 16 are mutually prime, so as to maximize the number of relative angular positions of the nut 13 relative to the rotary shaft 12 in which an inner notch 15 is to be found at least partially in alignment in a radial direction with an outer notch 16.

Figure 3:
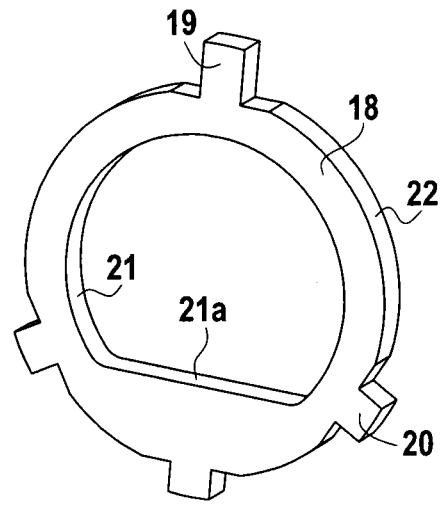
FIG. 3 is a perspective view of a ring of the FIG. 2 device.
Figure 4:
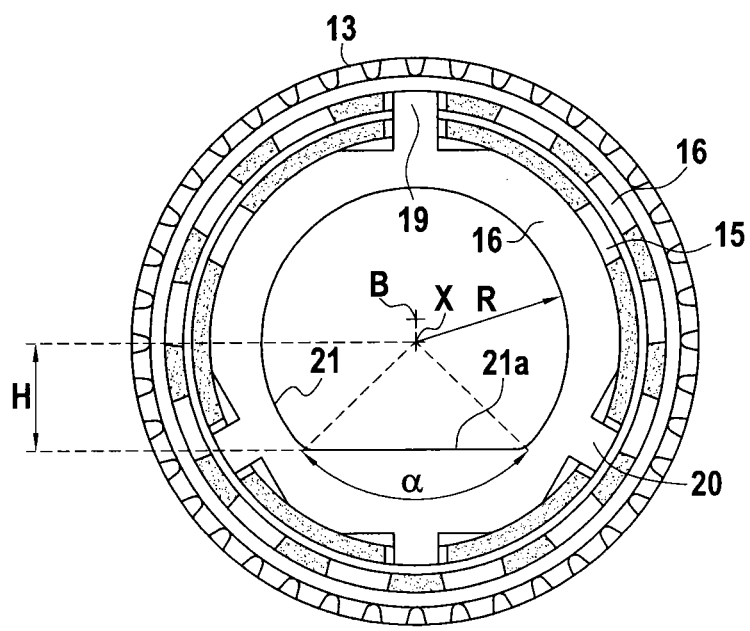
FIG. 4 is an end view of the FIG. 2 device.

In the embodiment shown in FIG. 2, a ring 18 co-operates with the inner notches 15 and the outer notches 16 so as to form a device for locking the nut 13 in its tightened position. More specifically, this ring 18, which is shown on its own in FIG. 3, presents a first finger 19 extending outwards in a first radial direction, and three other fingers 20 that are shorter than the first finger 19 and that also extend outwards along three other radial directions. More specifically, the angles between the radial fingers 19 and 20 of the ring 18 correspond substantially to multiples of the angles between the inner notches 15 formed in the end 14 of the rotary shaft 12. Thus, when the ring 18 is installed inside the end 14 of the rotary shaft 12, as shown in FIGS. 2 and 4, the first radial finger 19 is received both in an inner notch 15 and in an outer notch 16, which notches are mutually in alignment in a radial direction, thereby preventing the nut 13 from turning relative to the rotary shaft 12, while the other three radial fingers 20 are received in other inner notches 15 in order to stabilize the ring 18 and prevent it from tilting. For greater stability of the ring, the bottoms of the inner notches 15 and of the outer notches 16 may be substantially coplanar and lying in a single transverse plane A when the nut 13 is in its tightened position. Furthermore, the radial fingers 19 and 20 and the notches 15 and 16 may be dimensioned so as to minimize slack, in particular by giving them substantially the same width.

In order to center the center of mass of the ring 18 on the longitudinal axis X of the rotary shaft 12, and thus prevent the longer first radial finger 19 giving rise to unbalance, the barycenter B of the internal outline 21 of the ring 18 is offset relative to said longitudinal axis X, in particular towards said first radial finger 19. Thus, the eccentricity of this internal outline 21 forms additional mass M on the side opposite from the radial finger 19 about the longitudinal axis X, so as to center the center of mass of the ring 18 on the longitudinal axis X.

In particular, in order to form this additional mass M, the internal outline 21 may be an outline that is substantially circular with the exception of a flat 21A positioned opposite from the first radial finger 19 about the longitudinal axis X. This flat 21A may occupy a sector of angle α (alpha) that is equal to 90°±5°, for example. A fraction H/R of a minimum distance H between the flat 21A and the longitudinal axis X over a radius R of the substantially circular portion of the internal outline 21 may lie in the range 0.6 to 0.8, and in particular in the range ⅔ to ¾. Because of this flat 21A, and even if the substantially vertical portion of the internal outline 21 is centered on the longitudinal axis, the barycenter B of the set of points making up the internal outline 21 is offset from the longitudinal axis X. Other shapes for the internal outline 21 could nevertheless be envisaged as alternatives for obtaining this additional mass M. It is even possible to envisage that the internal outline of the ring is circular but eccentric relative to the longitudinal axis X.

The ring 18 may in particular be machined in sheet metal of greater or lesser thickness depending on requirements. Its internal and external outlines 21 and 22 may in particular be cut out and/or milled in the sheet metal.

Although the present invention is described with reference to a specific embodiment, it is clear that various modifications and changes may be applied to this embodiment without going beyond the general scope of the invention as defined by the claims. Consequently, the description and the drawings should be considered in a sense that is illustrative rather than restrictive.

The invention claimed is:

1. A locking device for locking a nut in a tightened position on a rotary shaft, said rotary shaft being hollow at least at one end, and said locking device comprising:
    a plurality of outer notches formed in a face of the nut, said outer notches extending parallel to a longitudinal axis of the nut;
    a plurality of inner notches formed in the end of the rotary shaft, said inner notches extending parallel to a longitudinal axis of the rotary shaft; and
    a ring suitable for being installed inside said end of the rotary shaft and presenting at least one first radial finger for being received both in one of the inner notches and in one of the outer notches with the nut being in a tightened position and the two notches housing said first radial finger being at least partially in alignment in a radial direction; and
    wherein the ring presents an internal outline arranged in such a manner that the barycenter of said internal outline is offset relative to said longitudinal axis when the ring is installed inside the end of the rotary shaft.

2. The locking device according to claim 1, wherein said internal outline is not circular.

3. The locking device according to claim 2, wherein said internal outline presents a flat.

4. The locking device according to claim 1, wherein the ring presents at least two other radial fingers that are shorter than the first finger, each of these at least two other fingers being received in respective ones of said inner notches.

5. The locking device according to claim 1, wherein the number of outer notches and the number of inner notches are mutually prime.

6. The locking device according to claim 1, wherein the inner notches and the outer notches present bottoms that are substantially aligned in a common transverse plane when the nut is in a tightened position.

7. The locking device according to claim 1, wherein only one inner notch and only one outer notch are positioned in order to receive the first radial finger with the nut in a tightened position.

8. The locking device according to claim 1, wherein all of the notches are of the same width.

9. A turbomachine having at least one rotary shaft, a nut, and a locking device for locking the nut on the rotary shaft in a tightened position, wherein the locking device comprises:
    a plurality of outer notches formed in a face of the nut, said outer notches extending parallel to a longitudinal axis of the nut;
    a plurality of inner notches formed in the end of the rotary shaft, said inner notches extending parallel to a longitudinal axis of the rotary shaft; and
    a ring suitable for being installed inside said end of the rotary shaft and presenting at least one first radial finger for being received both in one of the inner notches and in one of the outer notches with the nut being in a tightened position and the two notches housing said first radial finger being at least partially in alignment in a radial direction; and
    wherein the ring presents an internal outline arranged in such a manner that the barycenter of said internal outline is offset relative to said longitudinal axis when the ring is installed inside the end of the rotary shaft.

10. A method of locking a nut in a tightened position on a rotary shaft, a face of the nut presenting a plurality of outer notches extending parallel to a longitudinal axis of the nut, the rotary shaft being hollow at least at an end that presents a plurality of inner notches, and at least one of the inner notches and at least one of the outer notches being at least partially in alignment in a radial direction, said locking method comprising a step in which a ring presenting at least one first radial finger and an internal outline is installed inside said end of the rotary shaft with said at least one first radial finger received simultaneously in the inner notch and the outer notch that are in alignment, and with the barycenter of said internal outline being offset relative to said longitudinal axis.

* * * * *